United States Patent
Trigiani

(10) Patent No.: US 6,253,810 B1
(45) Date of Patent: Jul. 3, 2001

(54) APPARATUS FOR DETECTING LEAKS IN A PRESSURIZED AIR CONDITIONING OR REFRIGERATION SYSTEM

(75) Inventor: Phil Trigiani, Mississauga (CA)

(73) Assignee: UView Ultraviolet Systems, Inc., Mississauga (CA)

( * ) Notice: Subject to any disclaimer, the term of this patent is extended or adjusted under 35 U.S.C. 154(b) by 0 days.

(21) Appl. No.: 09/557,831

(22) Filed: Apr. 26, 2000

Related U.S. Application Data

(63) Continuation-in-part of application No. 09/535,368, filed on Mar. 24, 2000, which is a continuation of application No. 09/003,021, filed on Jan. 5, 1998, now Pat. No. 6,050,310, which is a continuation-in-part of application No. 08/710,486, filed on Sep. 18, 1996, now Pat. No. 5,826,636.

(51) Int. Cl.⁷ ..................................................... B65B 3/04
(52) U.S. Cl. ........................... 141/382; 141/383; 62/292
(58) Field of Search ................................... 141/382–384; 62/292, 293

(56) References Cited

U.S. PATENT DOCUMENTS

| | | |
|---|---|---|
| Re. 35,370 * 11/1996 | Henry . | |
| Re. 35,395 * 12/1996 | Henry . | |
| 1,672,421 * 6/1928 | Negley | 222/391 |
| 4,338,793 * 7/1982 | O'Hern, Jr. | 62/292 |
| 4,467,620 * 8/1984 | Bradley et al. | 62/292 |
| 4,948,016 8/1990 | Summons et al. | 222/158 |
| 5,027,605 7/1991 | Hardesty | 62/77 |
| 5,080,132 * 1/1992 | Manz et al. | 63/292 |
| 5,127,118 * 7/1992 | Johenning | 141/382 |
| 5,396,774 * 3/1995 | Hubbell, Jr. | 62/292 |
| 5,673,722 10/1997 | Brass | 137/15 |
| 5,699,678 * 12/1997 | Trigiani | 62/292 |
| 5,826,636 * 10/1998 | Trigiani | 141/382 |
| 5,967,204 10/1999 | Ferris et al. . | |

* cited by examiner

Primary Examiner—J. Casimer Jacyna
(74) Attorney, Agent, or Firm—Bell, Boyd & Lloyd LLC

(57) ABSTRACT

An apparatus (22) and method for detecting leaks in a pressurized air conditioning or refrigeration system (24) comprising a cartridge (26) is described. A facility (28) is for fluidly coupling the cartridge (26) to the pressurized system (24). An assemblage (30) is for forcing a secondary fluid (32) out of the cartridge (26), through the fluidly coupling facility (28) and into a service valve (34) of the pressurized system (24). The cartridge (26) has a first open end with an inner nozzle (33) which connects to the system being charged and an outer nozzle (37).

12 Claims, 19 Drawing Sheets

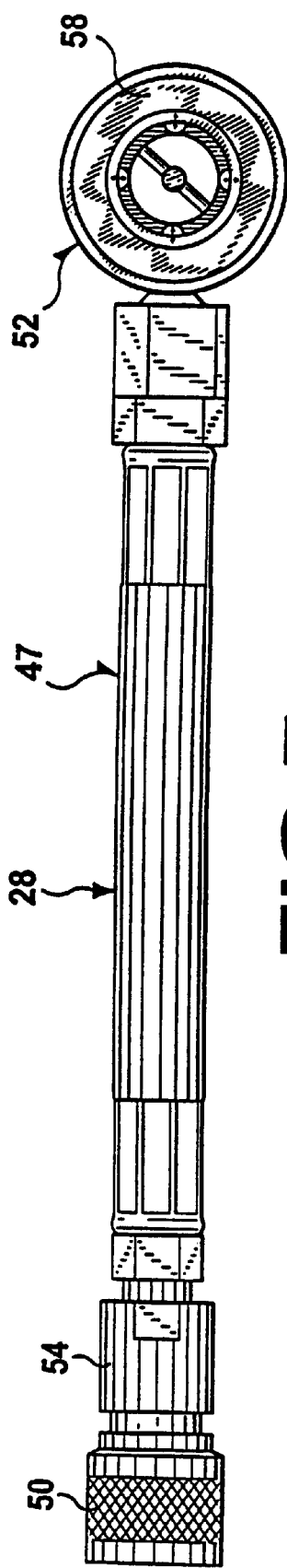
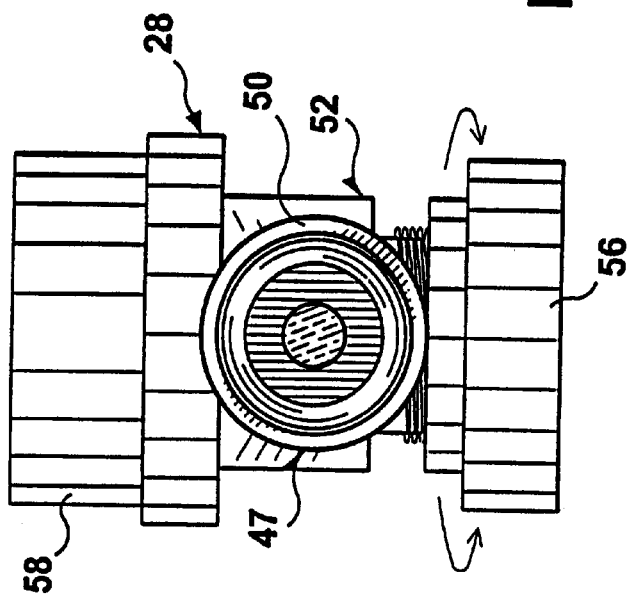
FIG 7
FIG 8

APPARATUS FOR DETECTING LEAKS IN A PRESSURIZED AIR CONDITIONING OR REFRIGERATION SYSTEM

This application is a continuation-in-part of U.S. patent application Ser. No. 09/535,368, filed Mar. 24, 2000, now pending, which is a continuation of U.S. patent application Ser. No. 09/003,021, filed Jan. 5, 1998, now U.S. Pat. No. 6,050,310, which is a continuation-in-part of U.S. patent application Ser. No. 08/710,486, filed Sep. 18, 1996, now U.S. Pat. No. 5,826,636, the entire contents of which are hereby incorporated by reference and relied upon.

BACKGROUND OF THE INVENTION

1. Field of the Invention

The instant invention relates generally to the field of pressurized fluid systems and more specifically it relates to an apparatus for detecting leaks in a pressurized air conditioning or refrigeration system. The purpose of the apparatus is to provide the technician with a simple method of injecting a predetermined amount of a secondary fluid, e.g., a fluorescent dye, and/or lubricant into a pressurized system.

2. Description of the Prior Art

Numerous pressurized fluid systems have been provided in the prior art that are adapted to operate optimally within a certain pressure range. If the internal pressure falls below this range, the system needs to be recharged with an appropriate lubricant. While these units may be suitable for the particular purpose to which they address, they would not be as suitable for the purposes of the present invention as heretofore described.

There does not presently exist a cost effective way to accomplish the task of inserting a predetermined amount of lubricant into a pressurized system. Added to this, is the fact that when a technician arrives on site they are faced with a myriad number of systems with service connection access ranging from the accessible to the acrobatic and often cramped working conditions.

Some systems contain a combination of fluids. For example, air conditioning and refrigeration systems generally contain a refrigerant (the primary fluid) in combination with a lubricating oil (the secondary fluid) for the compressor and other critical components. The lubricating oil is generally present in fairly low quantities, usually less than 5% of the total fluid. The present invention provides for the introduction of these and other secondary fluids into air conditioning or refrigeration systems charged with the primary fluids in order to detect leaks in the pressurized systems.

Furthermore, air conditioning or refrigeration system leaks are difficult to locate because refrigerants are generally odorless and colorless gases. The present invention provides for a device and method for injecting a small amount of a concentrated fluorescent additive or dye into the system, thereby making the leaks easier to find. The fluorescent dye can be injected into the system with the present device or they can be placed in the systems at the original equipment manufacturing facility prior to the system being put into service. These air conditioning and refrigeration systems are closed loop recirculating systems and the secondary fluid is a lubricant that also travels throughout the system while in operation. The dye will travel throughout the system and leak out with the refrigerant. The dye will leave a stain that can be further enhanced with the use of an ultraviolet (UV) lamp. The UV wavelength of light will excite the dye allowing the operator to more easily identify the exact location of the leak. The device can also be used to add the appropriate lubricant to the air conditioning or refrigeration system without stopping the system and without any special equipment.

A cartridge that is at or about atmospheric pressure while not in use contains the concentrated fluorescent dye and/or lubricant. The cartridge is connected to the device of the present invention in a way that will raise the pressure of the dye above that of the operating system. The connection between the device and the operating system must be airtight. The connection can be a quick coupler, thread or other means of positive, sealed connection.

SUMMARY OF THE INVENTION

The preferred embodiment of the present invention is for an apparatus for detecting leaks in a pressurized air conditioning or refrigeration system and includes an injection device with a receptacle portion for receiving a disposable or reusable lubricant canister and a connector assembly for attaching the lubricant canister to the pressurized system. The lubricant canister contains lubricant and/or fluorescent dye. It is a further aim of the present invention not to limit the mechanical means of lubricant and/or fluorescent dye delivery just to hand pressure, but to provide other embodiments using various types of hand tools and structures to accomplish the delivery of the lubricant and/or fluorescent dye to the pressurized system.

More specifically, the present invention is for an apparatus for detecting leaks in a pressurized air conditioning or refrigeration system, comprising a canister containing a secondary fluid, where the secondary fluid comprises a fluorescent dye; means for fluidly coupling the canister to the pressurized system; and means for forcing the secondary fluid out of the canister, through the fluidly coupling means and into a service valve of the pressurized system.

In a preferred embodiment, the canister includes a tubular casing for holding the secondary fluid therein; a threaded nozzle integral with and extending out from a first end of the tubular casing to engage with one end of the fluidly coupling means; and a piston inserted within an open second end of the tubular casing to engage with a secondary fluid forcing means.

In a more preferred embodiment, the tubular casing is fabricated out of transparent material and includes a plurality of gradient markings to aid in accurately dispensing a predetermined amount of the secondary fluid therefrom. In another embodiment, the canister further includes a threaded cap, to engage with the threaded nozzle when the canister is not in use, so as to prevent leakage of the secondary fluid through the threaded nozzle.

In another preferred embodiment, the fluidly coupling means is a connector assembly having a first end connected to the threaded nozzle of the canister and a second end connected to the service valve of the pressurized system. In a more preferred embodiment, the connector assembly includes a flexible conduit; a thread on the first end of the flexible conduit, to engage with the threaded nozzle of the canister; and a release valve on a second end of the flexible conduit, to engage with the service valve of the pressurized system.

In another preferred embodiment, the connector assembly further includes a one-way check valve at the first end of the flexible conduit, which prevents any material from back flushing into and contaminating the secondary fluid in the canister.

In yet another preferred embodiment, the release valve includes a closeable valve, which prevents any material from back flushing into the flexible conduit from the service valve of the pressurized system, and to allow the release valve to disconnect from the service valve of the pressurized system, to prevent leakage of the secondary fluid therefrom.

In more preferred embodiments, the release valve includes a snap lock fitting to engage with the service valve of the pressurized system or includes a threaded fitting, to engage with the service valve of the pressurized system.

In another more preferred embodiment, the secondary fluid forcing means is an injection device. In yet another more preferred embodiment, the injection device includes a housing having a receptacle portion to receive the canister therein; and a drive mechanism to force the piston into the tubular casing, to cause the secondary fluid to exit the threaded nozzle through the fluidly coupling means, past the service valve and into the pressurized system.

In another preferred embodiment, the drive mechanism includes a hand grip integral with and extending downwardly on the housing; a trigger pivotally mounted to the housing adjacent the hand grip; a central drive shaft extending longitudinally through the housing and transversely past a pivotal portion of the trigger; a cylindrical head on an inner end of the central drive shaft, to engage with the piston of the canister; a first pawl spring biased on the central drive shaft forward the pivotal portion of the trigger; and a second pawl spring biased on the central drive shaft rearward the pivotal portion of the trigger, the second pawl having a tongue extending out through a rear wall of the housing above the hand grip, so that when the trigger is squeezed, the first pawl will move into contact with the central drive shaft, to push the central drive shaft forward with the cylindrical head making contact with the piston, while the second pawl prevents reverse movement of the central drive shaft, until the tongue disengages the second pawl, allowing the central drive shaft to be pulled back to a desired position.

In a more preferred embodiment, the drive mechanism includes a hand grip integral with and extending downwardly on the housing; a trigger pivotally mounted to the housing adjacent the hand grip; a central drive shaft extending longitudinally through the housing and transversely above a pivotal portion of the trigger, the central drive shaft having a plurality of teeth extending therealong; a cylindrical head on an inner end of the central drive shaft, to engage with the piston of the canister; and a pawl pivotally mounted between the pivotal portion of the trigger and the housing, so that when the trigger is squeezed, the pawl will move into contact with the teeth on the central drive shaft, to push the central drive shaft forward with the cylindrical head making contact with the piston.

In another more preferred embodiment, the drive mechanism includes a second pawl spring biased in the housing to make contact with the teeth on the central drive shaft forward the first pawl, to prevent reverse movement of the central drive shaft.

In yet another more preferred embodiment, the drive mechanism includes a stationary nut mounted vertically within a rear wall of the housing; an elongated threaded rod extending longitudinally through the stationary nut; a cylindrical head on an inner end of the elongated threaded rod, to engage with the piston of the canister; and means on an outer end of the elongated threaded rod for rotating the elongated threaded rod through the stationary nut and moving the elongated threaded rod with the cylindrical head forward, to make contact with the piston.

In another preferred embodiments, the rotating means is a bolt head which can be turned by an open end and box wrench, is a socket head which can be turned by a ratchet socket wrench or is a handle rod extending transversely through the outer end of the elongated threaded rod which can be turned by a hand of a person.

In another preferred embodiment, the drive mechanism includes a rear chamber formed within the housing and having an inlet port to allow compressed gas to enter the rear chamber; a central drive shaft carried longitudinally within the tubular casing of the canister; a cylindrical head on an inner end of the central drive shaft, to engage with the piston; and a transverse drive plate on an outer end of the central drive shaft within the tubular casing adjacent the rear chamber, so that when the compressed gas is introduced through the inlet port into the rear chamber, the transverse drive plate will push the central drive shaft forward with the cylindrical head to make contact with the piston.

The present invention also discloses a canister or cartridge for charging a closed, pressurized air conditioning or refrigeration system with a fluid. The cartridge comprises a closed, non-pressurized cylindrical cartridge, where the cartridge has two ends, a first open end and a second open end, where the first open end comprises an inner nozzle which connects to the system being charged and an outer nozzle; a predetermined amount of the fluid; and a piston sealably disposed with the second open end of the cartridge, where the cartridge is adapted to connect sealably and releasably to the pressurized air conditioning or refrigeration system to form a closed binary system.

In preferred embodiments of the cartridge, the fluid comprises a lubricant for the air conditioning or refrigeration systems; the fluid comprises a fluid dye for the air conditioning or refrigeration systems; or the fluid comprises a lubricant and a fluid dye for the air conditioning or refrigeration systems.

In other preferred embodiments of the cartridge, the fluid is maintained in the cartridge at about ambient pressure; and/or the cartridge is fabricated out of transparent material and includes a plurality of gradient markings.

In yet other preferred embodiments of the cartridge, the inner nozzle is surrounded by an internal thread; the outer nozzle is surrounded by an external thread; the outer nozzle comprises a threaded cap for engagement with the external thread; and/or the inner nozzle is surrounded by an internal thread and the outer nozzle is surrounded by an external thread.

In still other preferred embodiments of the cartridge, the piston further comprises an O-ring; or the piston further comprises a recessed double O-ring.

The present invention also discloses a method for detecting leaks in a pressurized air conditioning or refrigeration system. The method comprises the steps of charging the pressurized air conditioning or refrigeration system with a fluorescent dye with the apparatus of the present invention; inspecting the pressurized air conditioning or refrigeration system for leaks of the fluorescent dye from the pressurized air conditioning or refrigeration system; and detecting any leaks in the pressurized air conditioning or refrigeration system. In a preferred embodiment, the inspecting is done with ultraviolet light.

Thus, a primary object of the present invention is to provide an apparatus for detecting leaks in a pressurized air conditioning or refrigeration system that will overcome the shortcomings of the prior art devices.

Another object is to provide an apparatus for detecting leaks in a pressurized air conditioning or refrigeration system that will allow a technician to inject a predetermined amount of lubricant and/or fluorescent dye into the pressurized system.

It is yet a further object of the invention to provide a method and apparatus for charging a pressurized air conditioning/refrigeration line with a lubricant and/or fluorescent dye from a closed, non-pressurized charging cartridge containing a predetermined amount of such lubricant and/or fluorescent dye.

An additional object is to provide an apparatus for detecting leaks in a pressurized air conditioning or refrigeration system which can be readily carried to a site, be easily operated, and can deliver a measured amount of lubricant and/or fluorescent dye into the pressurized system.

A further object is to provide an apparatus for detecting leaks in a pressurized air conditioning or refrigeration system that is simple and easy to use.

A still further object is to provide an apparatus for detecting leaks in a pressurized air conditioning or refrigeration system that is economical in cost to manufacture.

It is yet a further object to present an apparatus and method for detecting leaks in air conditioning or refrigeration systems by injecting a fluorescent dye into the systems and then inspecting the system for leaks of the fluorescent dye from the systems.

Further objects of the invention will appear as the description proceeds.

To the accomplishment of the above and related objects, this invention may be embodied in the form illustrated in the accompanying drawings, attention being called tot he fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 7 is a top view taken in the direction of arrow 7 in FIG. 6.

FIG. 8 is an end view taken in the direction of arrow 8 in FIG. 6.

Figure 12:
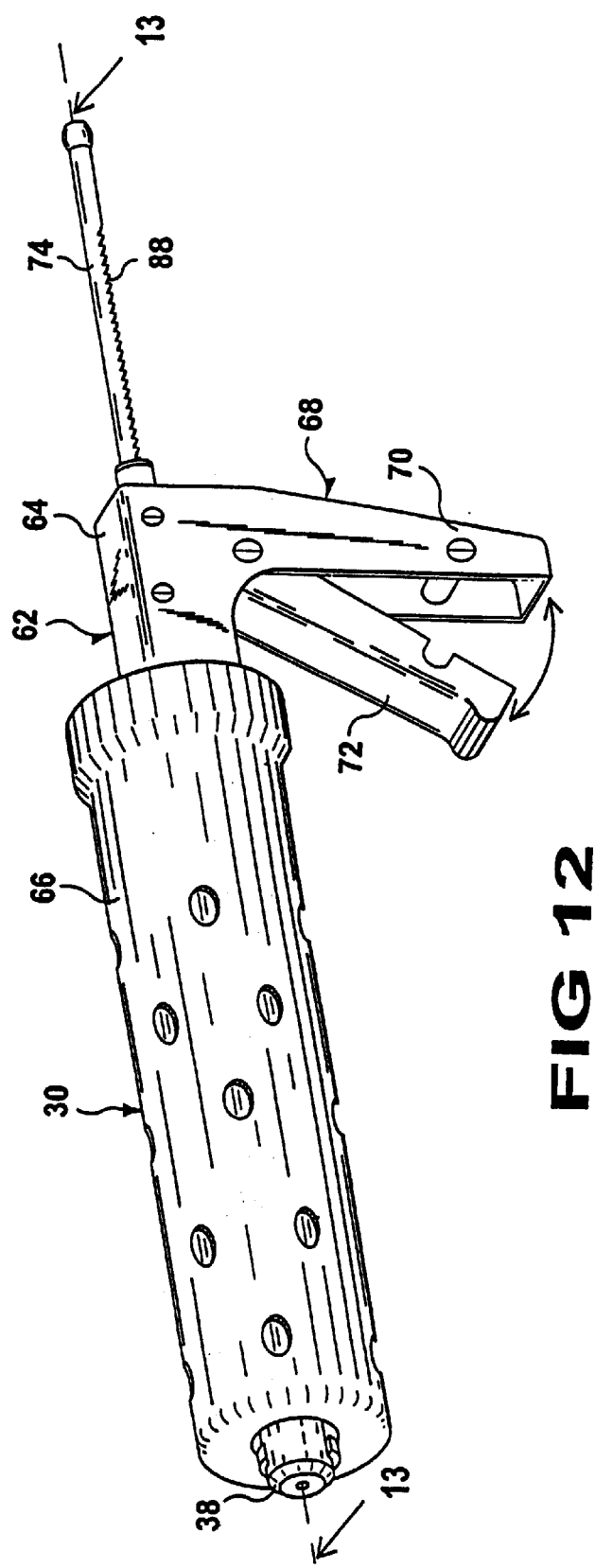

FIG. 12 a perspective view of a second embodiment of the injection device.

Figure 13:
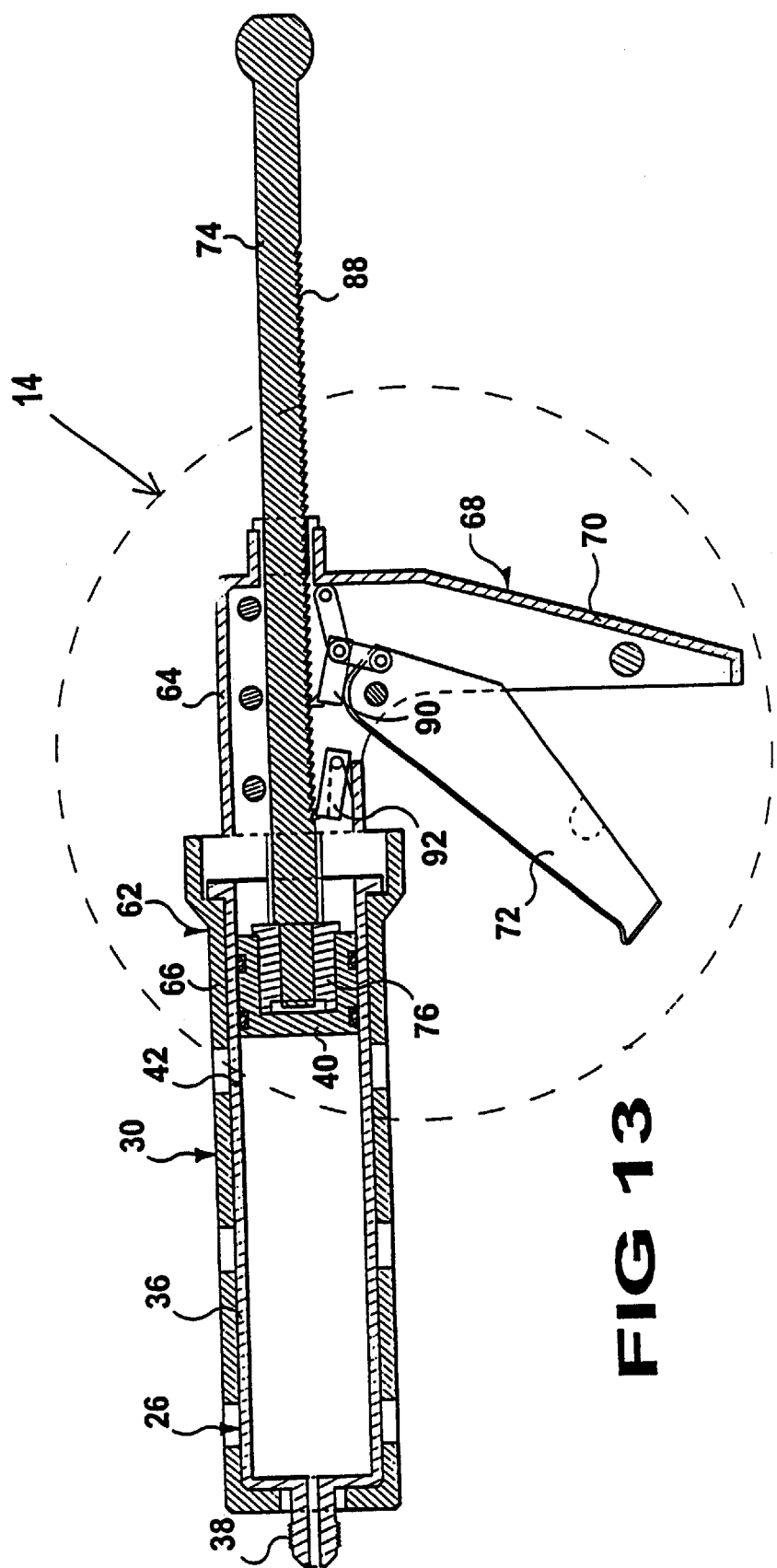

FIG. 13 is a cross sectional view taken along line 13—13 in FIG. 12.

Figure 14:
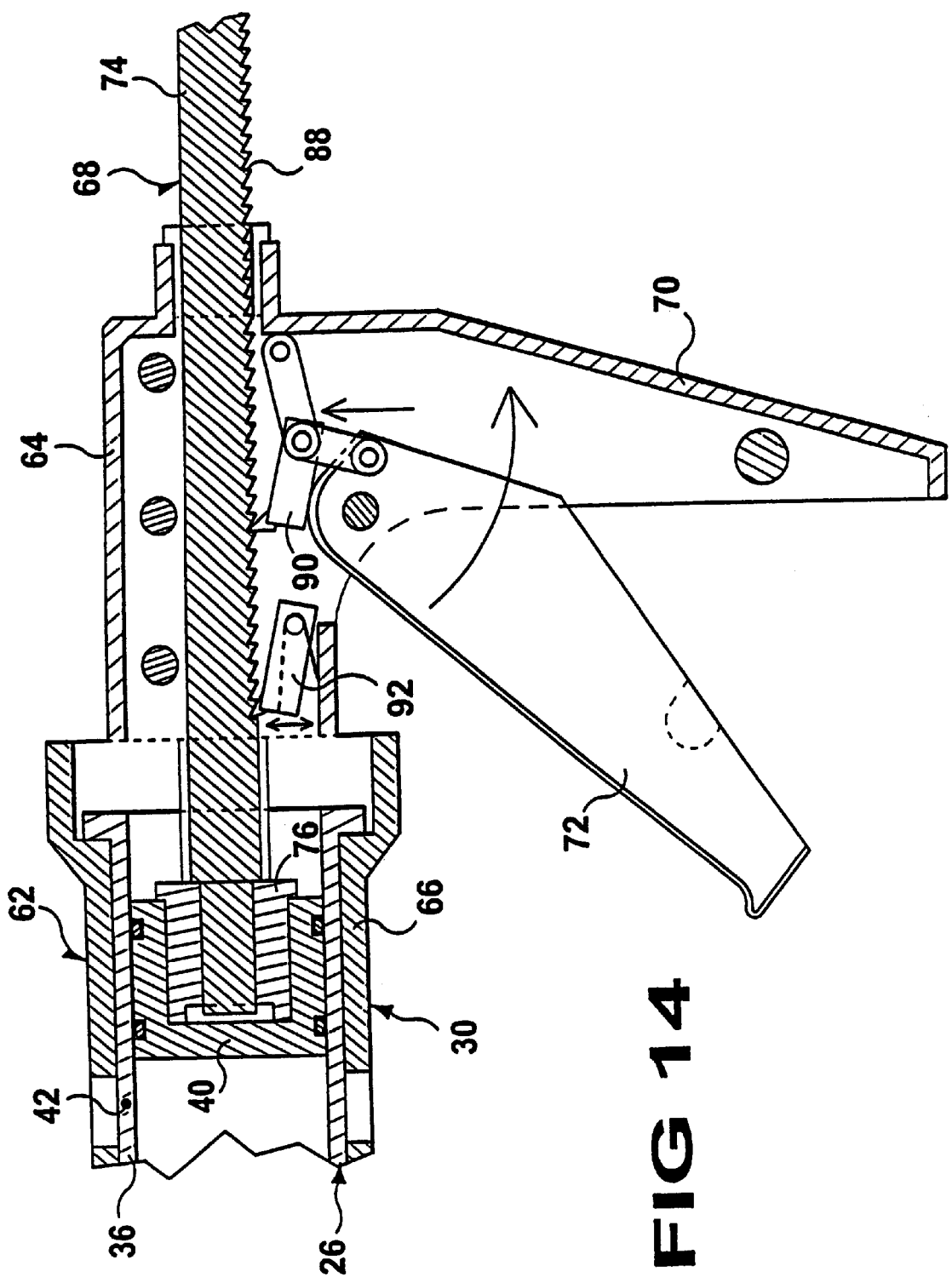

FIG. 14 is an enlarged cross sectional view of an area in FIG. 13 as indicated by arrow 14.

Figure 15:
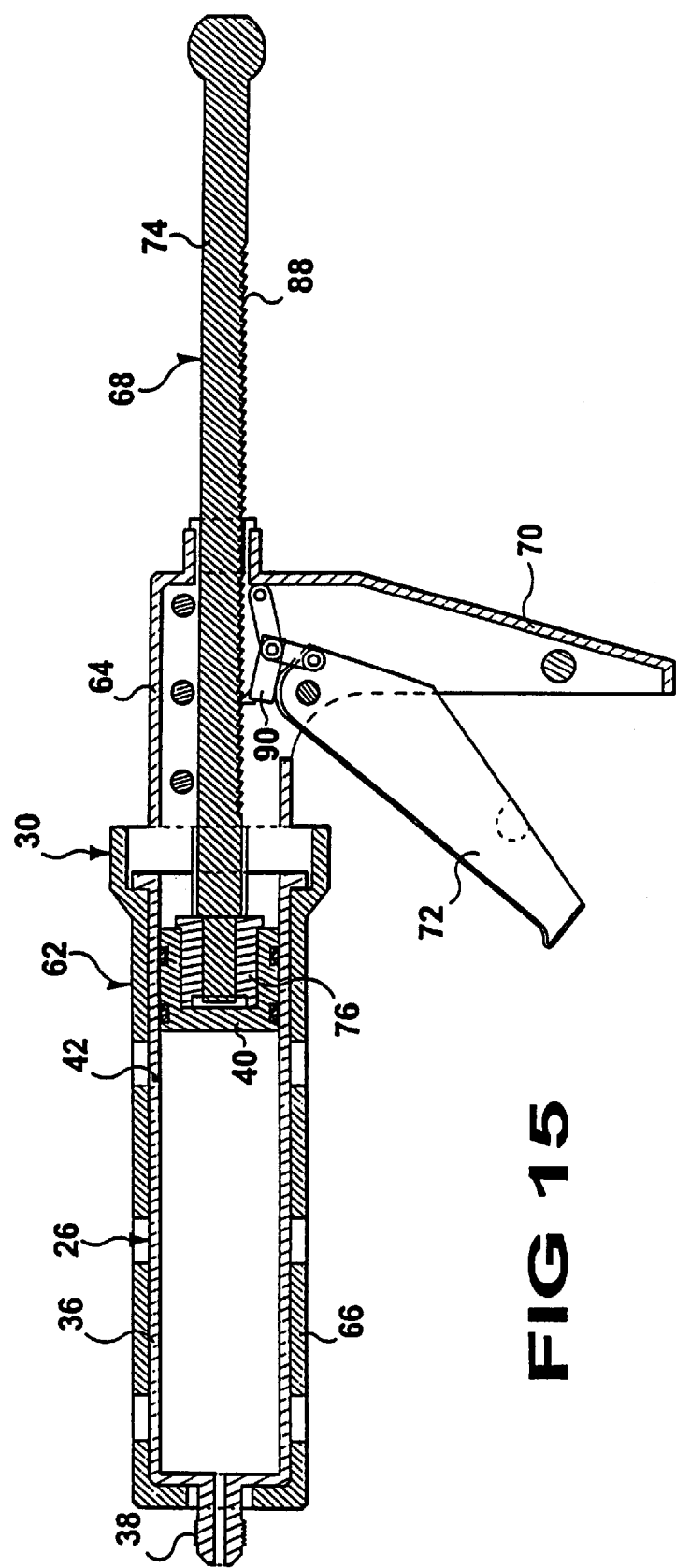

FIG. 15 is a cross sectional view similar to FIG. 13, showing a single pawl mechanism to propel the toothed central shaft in the injection device.

Figure 16:
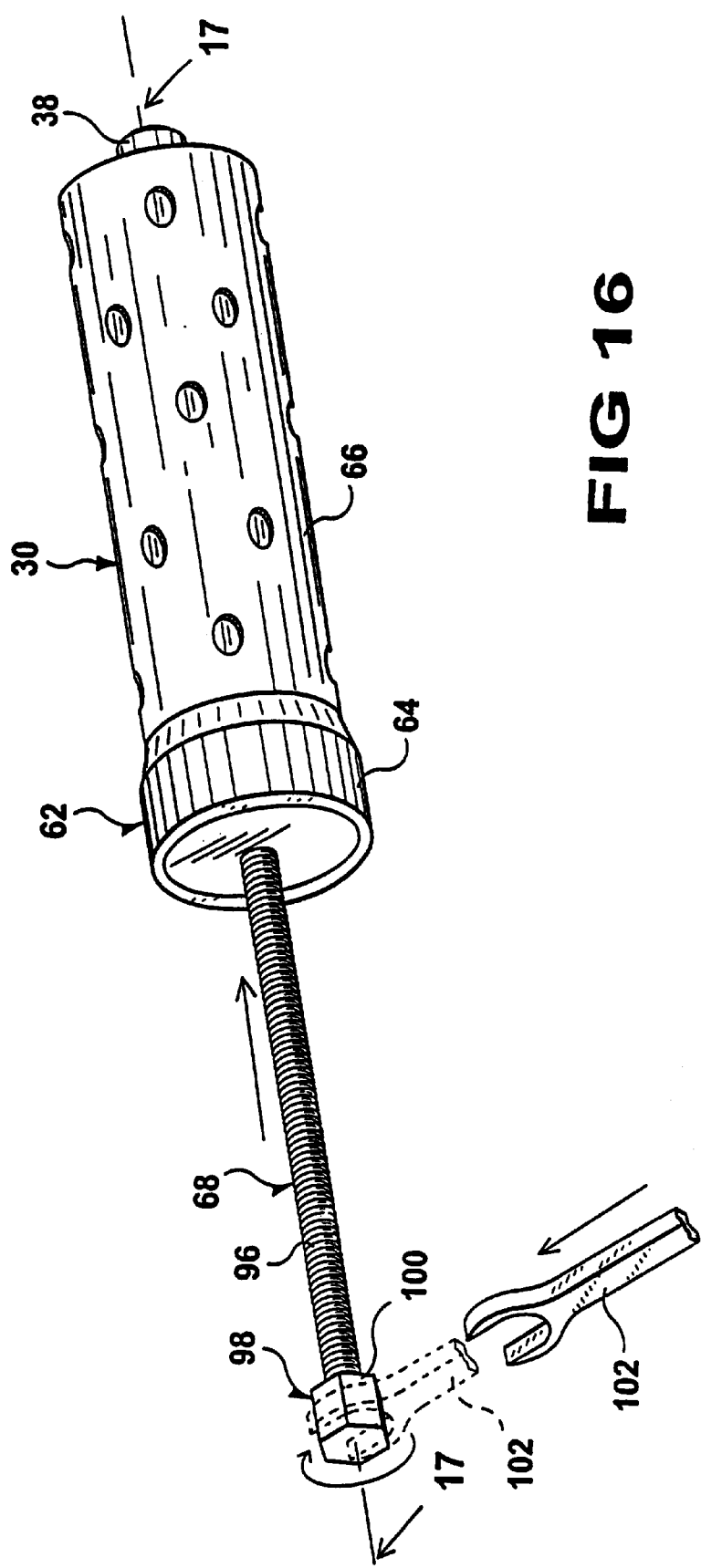

FIG. 16 is a perspective view of a third embodiment of the injection device.

Figure 17:
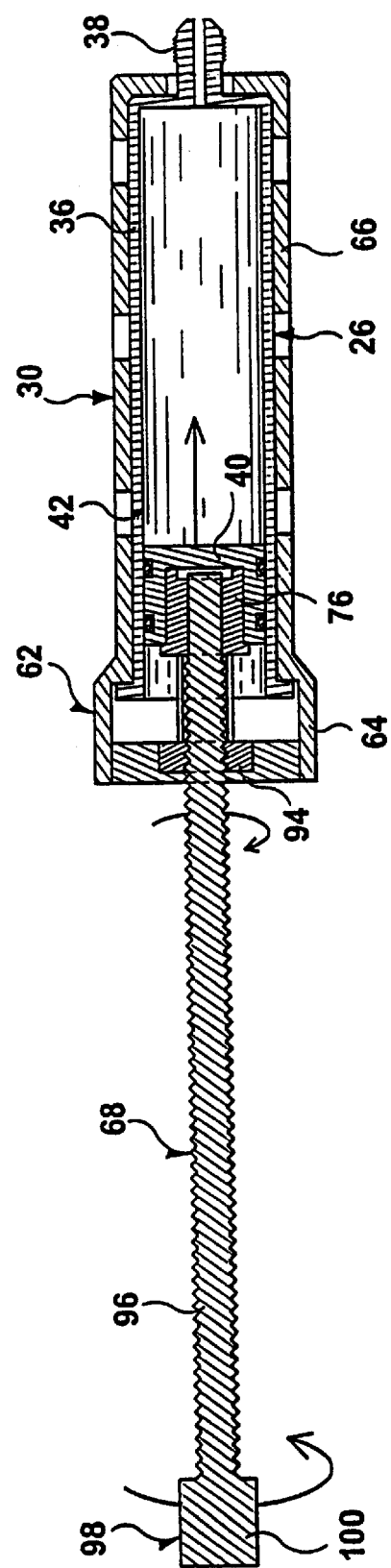

FIG. 17 is a cross sectional view taken along line 17—17 in FIG. 16.

Figure 18:
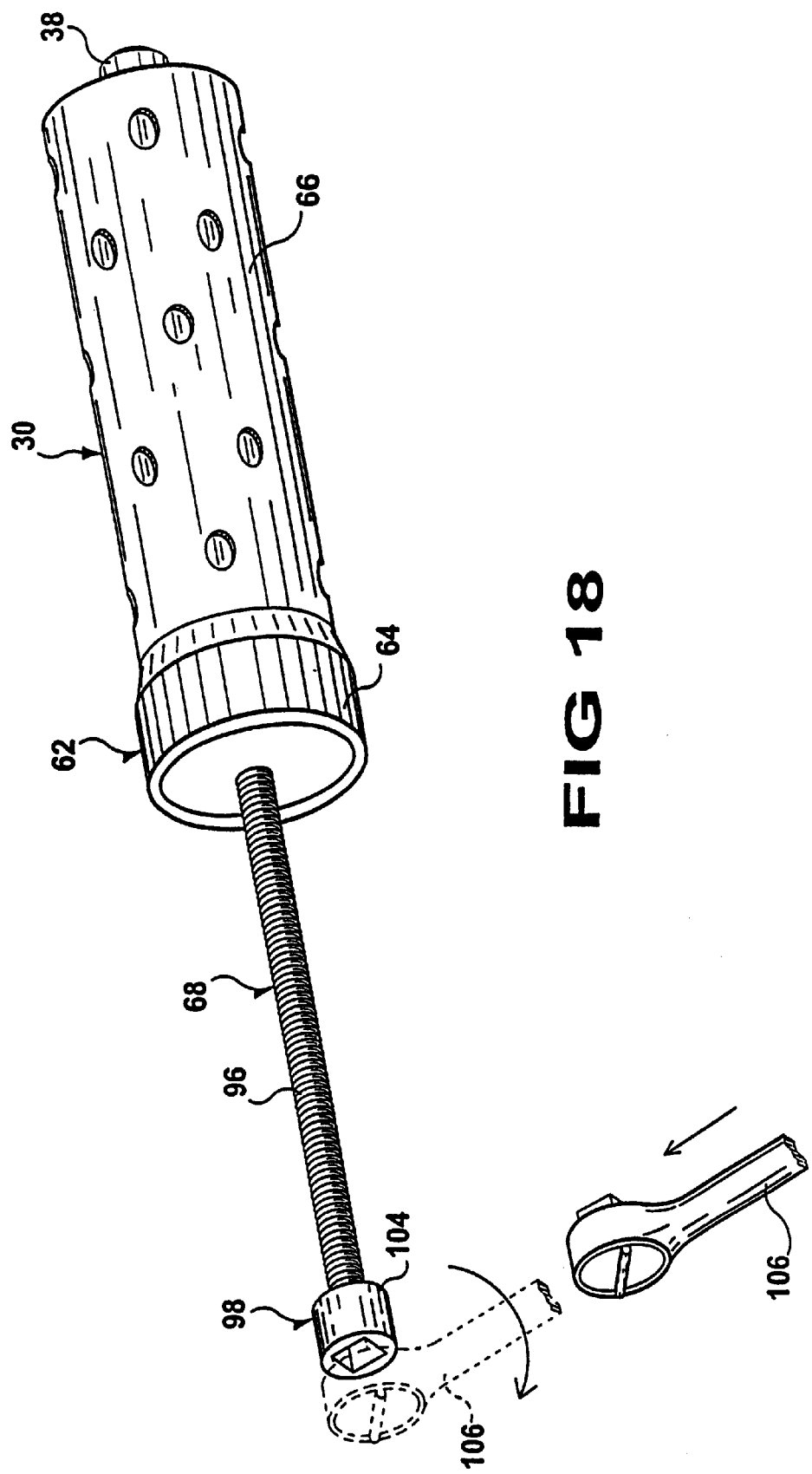

FIG. 18 is a perspective view similar to FIG. 16, showing a socket wrench to turn the operating screw in the injection device.

Figure 19:
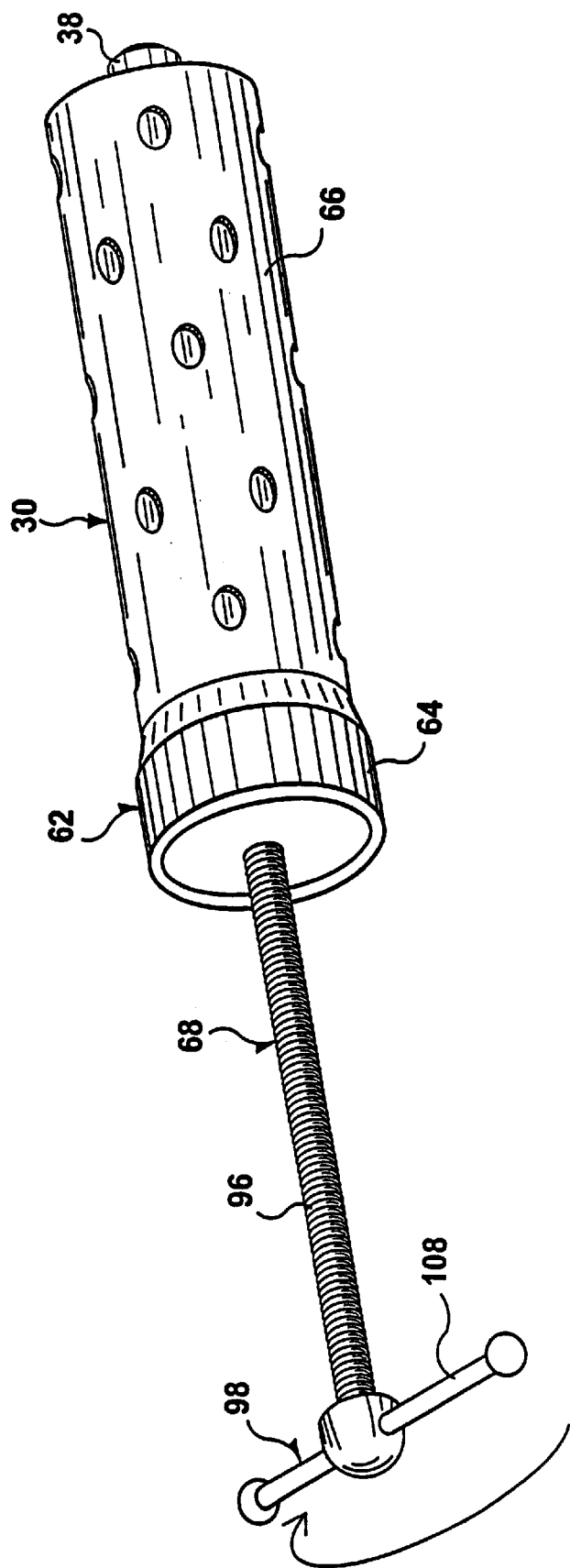

FIG. 19 is a perspective view similar to FIG. 18, showing a transverse handle to turn the operating screw in the injection device.

Figure 20:
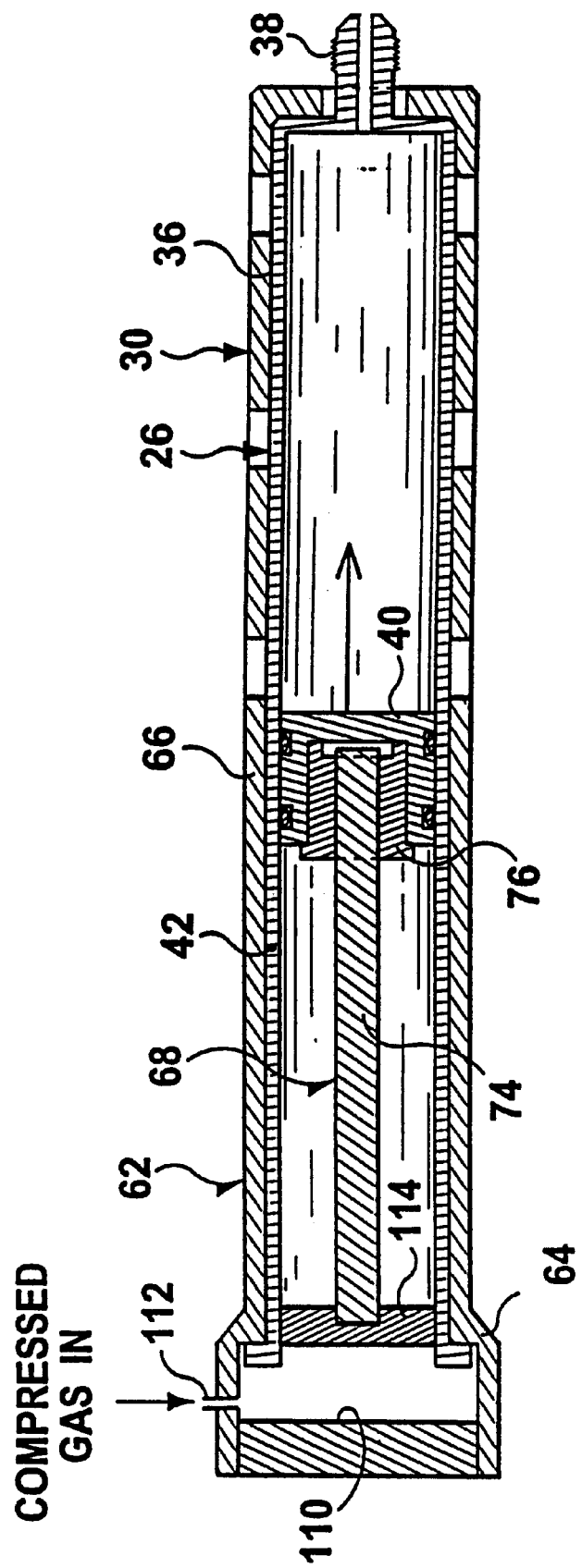

FIG. 20 is a cross sectional view of a fourth embodiment of the injection device, whereby compressed gas is introduced within a chamber to drive the piston forward in the lubricant canister.

Figure 21A:
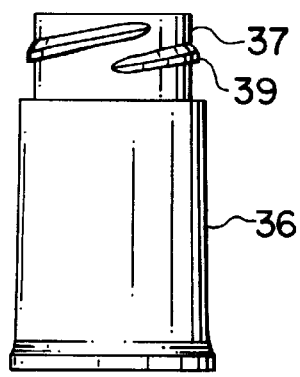
Figure 21B:
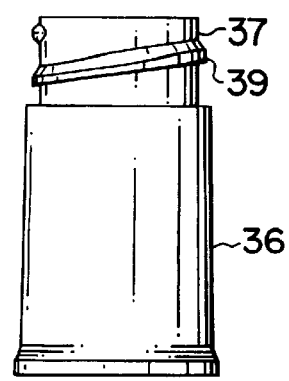
Figure 21C:
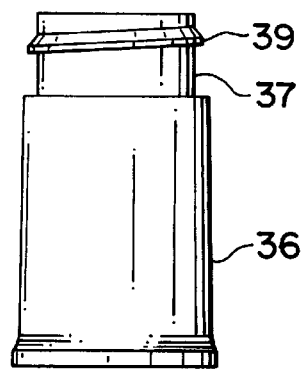
Figure 21D:
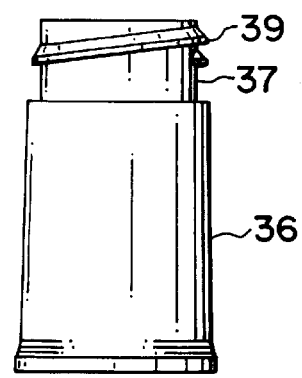
Figure 21E:
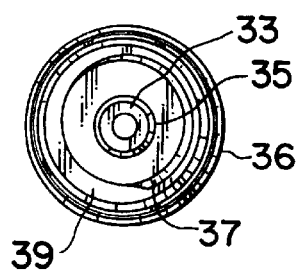
Figure 21F:
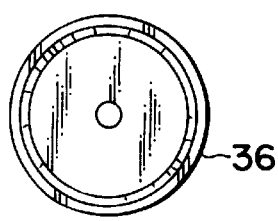

FIGS. 21A–F show a preferred embodiment of the cartridge of the present invention. FIG. 21A is a front view of the cartridge. FIG. 21B is a back view of the cartridge. FIGS. 21C and 21D are the left and right side view, respectively, of the cartridge. FIG. 21E is a top view and FIG. 21F is a bottom view of the cartridge.

Similar reference characters denote corresponding features consistently throughout the attached drawings.

DETAILED DESCRIPTION OF THE PREFERRED EMBODIMENTS

Figure 1:
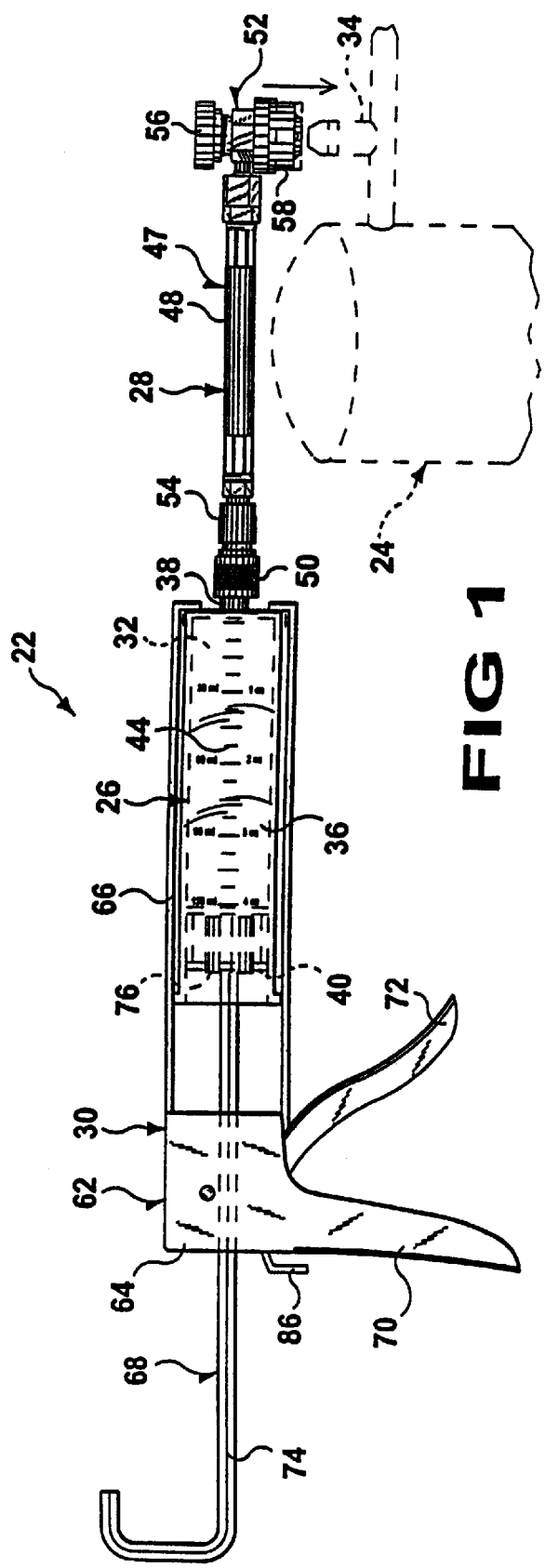
FIG. 1 is a side view of a first embodiment of the present invention.

Turning now descriptively to the drawings, in which similar reference characters denote similar elements throughout the several views, FIG. 1 illustrates the present invention being an apparatus 22 for detecting leaks in a pressurized air conditioning or refrigeration system 24. With regard to the reference numerals used, the following numbering is used throughout the various drawing figures.

22 charging apparatus
24 pressurized system
26 canister of 22
28 fluidly coupling facility of 22
30 lubricant or secondary fluid forcing assemblage of 22
32 lubricant and/or fluorescent dye of 26
33 central nipple or inner nozzle
34 service valve of 24
35 internal thread
36 tubular casing of 26
37 outer nozzle
38 threaded nozzle of 26 on 36
39 external thread
40 piston of 26 in 36
42 transparent material for 36
44 gradient marking on 36
46 threaded cap of 26 on 38
47 connector assembly for 28
48 flexible conduit of 47
50 threaded fitting of 47 on 48
52 release valve of 47 on 48
54 one-way check valve of 47
56 closeable control knob or valve of 52
58 snap lock fitting of 52
60 threaded fitting of 52
62 injection device for 30

64 housing of 62
66 receptacle portion of 64
68 drive mechanism of 30
70 hand grip of 68
72 trigger of 68
74 central drive shaft of 68
76 cylindrical head of 68 on 74
78 first pawl of 64
80 spring of 78
82 second pawl of 64
84 spring of 82
86 tongue of 82
88 teeth on 74
90 first pawl pivotally mounted between 72 and 64
92 second pawl on 64
94 stationary nut of 68
96 elongated threaded rod of 68
98 rotating structure of 68 on 96
100 bolt head for 98
102 open and wrench
104 socket head for 98
106 ratchet socket wrench
108 handle rod for 98
110 rear chamber of 68 in 64
112 inlet port of 110
114 transverse drive plate of 68

The apparatus 22 for detecting leaks in a pressurized air conditioning or refrigeration system 24 comprises a lubricant canister 26. A facility 28 is for fluidly coupling the lubricant canister 26 to the pressurized system 24. An assemblage 30 is for forcing lubricant and/or fluorescent dye 32 out of the lubricant canister 26, through the fluidly coupling facility 28 and into a service valve 34 of the pressurized system 24.

The lubricant canister or cartridge 26, as shown in FIGS. 1, 4, 5, 13, 14, 15, 17 and 20 includes a tubular casing 36 for holding the lubricant and/or fluorescent dye 32 therein. A threaded nozzle 38 is integral with and extends out from a first end of the tubular casing 36, to engage with one end of the fluidly coupling facility 28. A piston 40 is inserted within an open second end of the tubular casing 36, to engage with the lubricant forcing assemblage 30.

Figure 4:
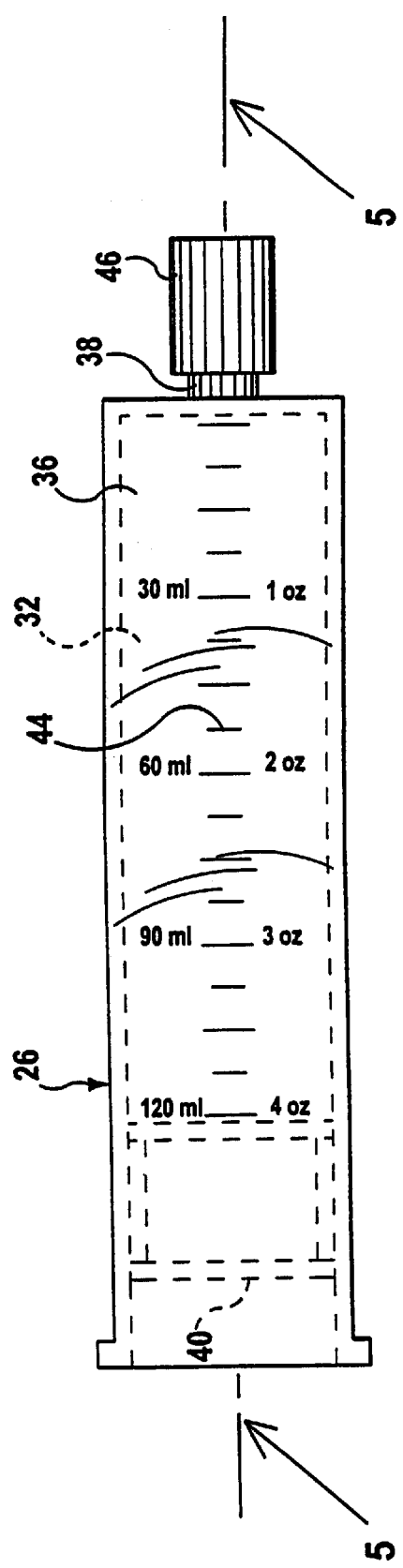
FIG. 4 is an enlarged side of the lubricant canister in FIG. 1.
Figure 5:
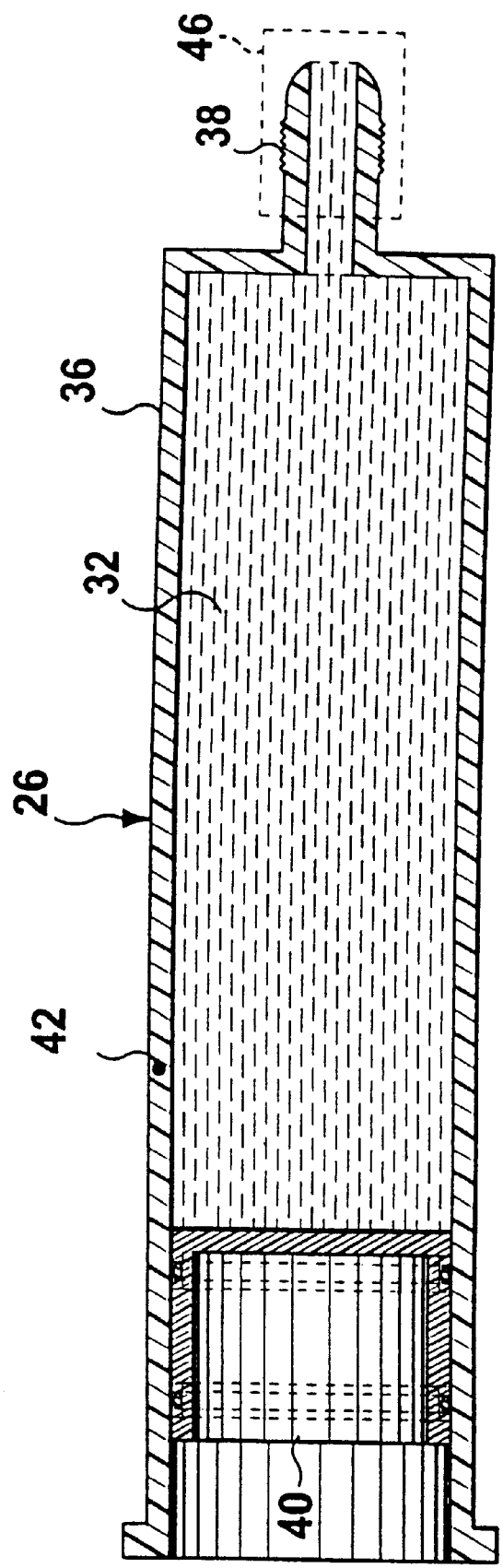
FIG. 5 is a cross sectional view taken along line 5—5 in FIG. 4.
Figure 6:
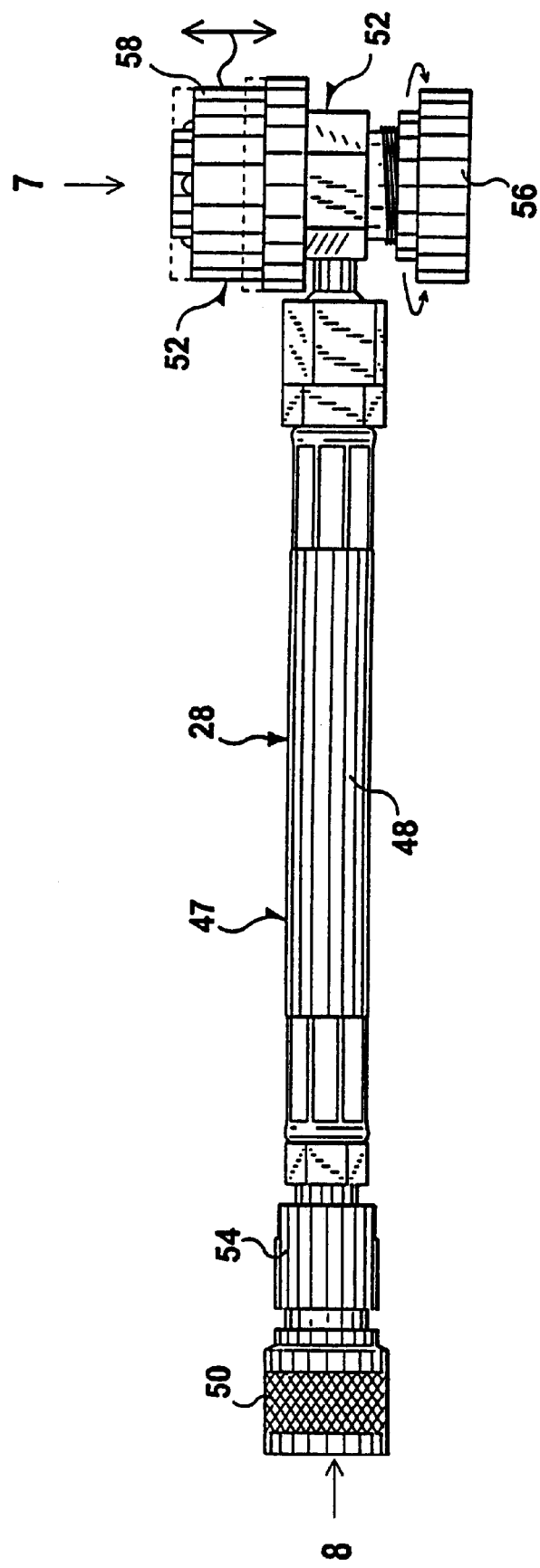
FIG. 6 is a side view of the connector assembly in FIG. 1.
Figure 9:
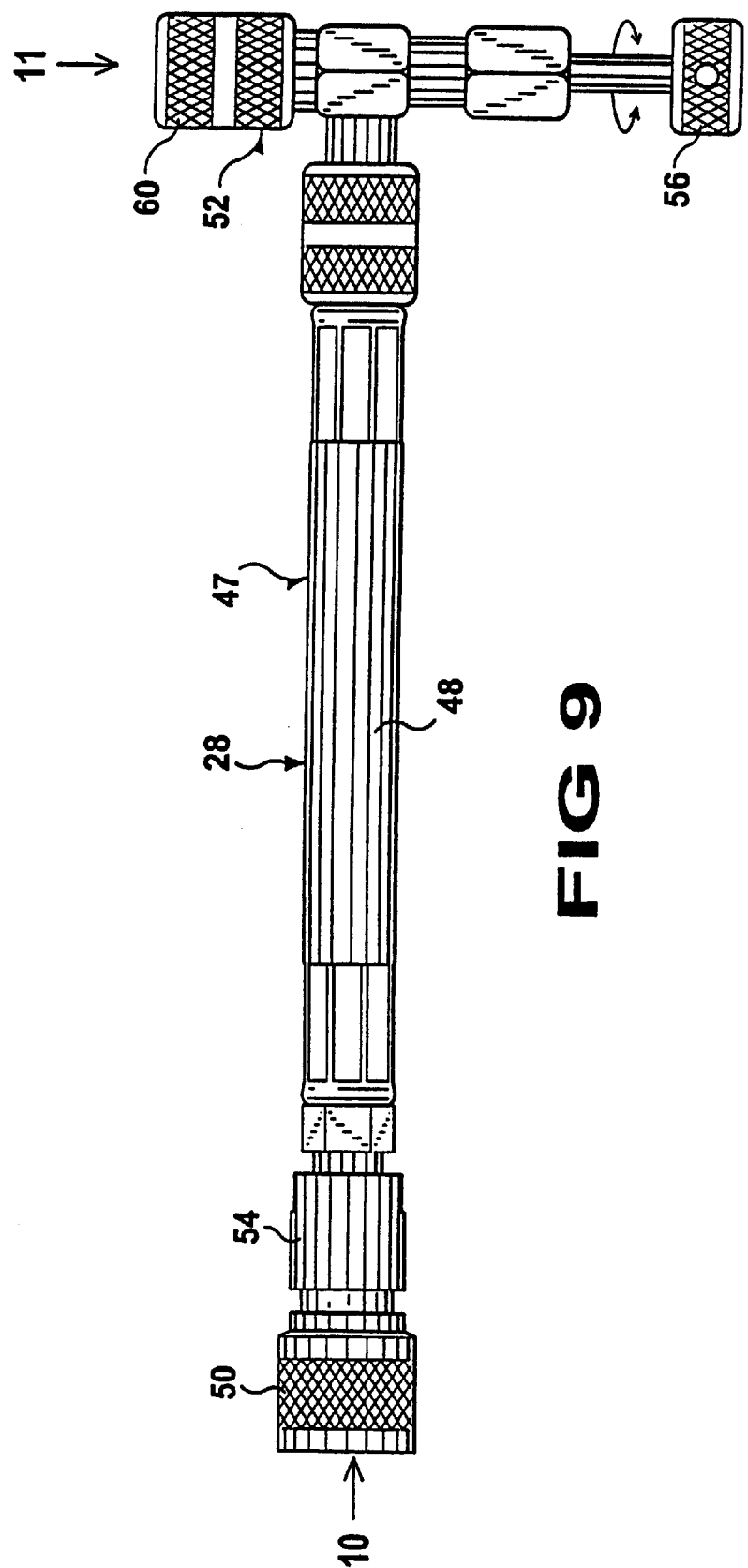
FIG. 9 is a side view of a second embodiment of the connector assembly.
Figure 10:
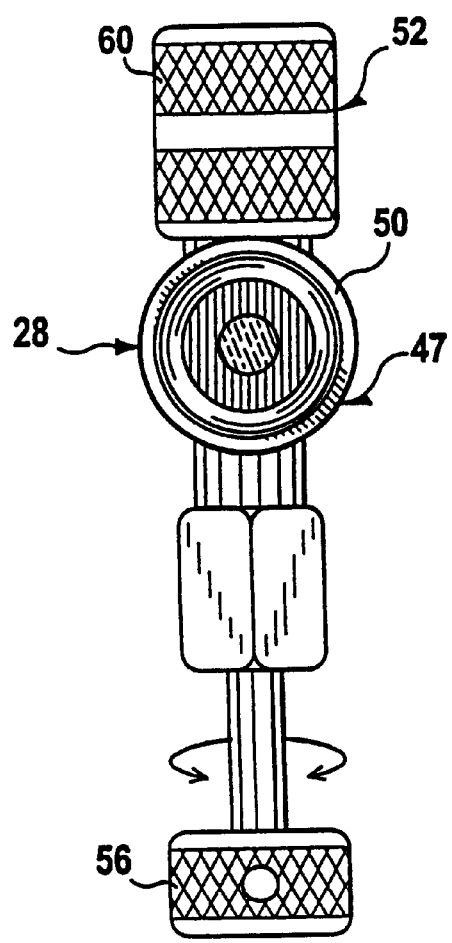
FIG. 10 is an end view taken in the direction of arrow 10 in FIG. 9.
Figure 11:
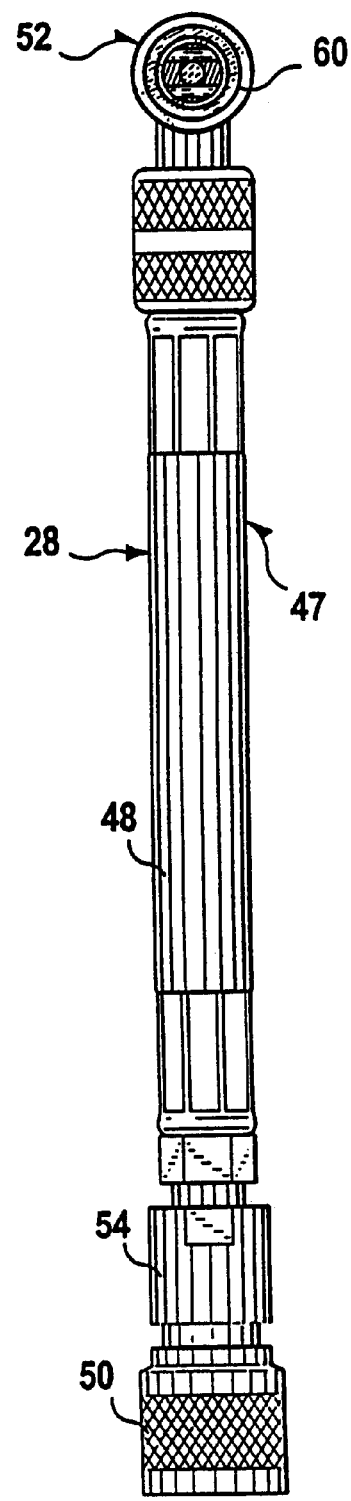
FIG. 11 is a top view taken in the direction of arrow 11 in FIG. 9.

The tubular casing 36 can be fabricated out of transparent material 42 and can include a plurality of gradient markings 44, to aid in accurately dispensing a predetermined amount of the lubricant and/or fluorescent dye 32 therefrom. The lubricant canister 26 further includes a threaded cap 46, as shown in FIGS. 4 and 5, to engage with the threaded nozzle 38 when the lubricant canister 26 is not in use, so as to prevent leakage of the lubricant and/or fluorescent dye 32 through the threaded nozzle 38.

In a preferred embodiment of the lubricant canister or cartridge 26, as shown in FIG. 21, a central nipple or inner nozzle 33 is integral with and extends out from the first end of the tubular casing 36, to engage with one end of the fluidly coupling facility 28. The central nipple or inner nozzle 33 is surrounded by an internal thread 35 to facilitate engagement with one end of the fluidly coupling facility 28. The lubricant canister or cartridge 26 further includes an outer nozzle 37 surrounded by an external thread 39 to engage with a threaded cap when the lubricant canister 26 is not in use, so as to prevent leakage of the lubricant and/or fluorescent dye 32 through the threaded nozzle. The external threads 39 are fitted for a drip cap with a standard size.

In practice, the central nipple or inner nozzle 33 can be made to extend slightly beyond the end of the outer nozzle 37. A cap with an induction seal, which seals on the central nipple or inner nozzle 33, can be used. These caps are lined with tinfoil, so that a heated, sealed end results which is able to withstand pressure and which seals directly to the lubricant or dye, if there is any present.

The design of the internal thread 35 allows a threaded check valve to mate with and to force the sealing area down the central nipple or inner nozzle 33. The central nipple 33 is tapered slightly to allow easy installation and sealing with an O-ring on the inside of the check valve of the fluidly coupling facility 28 and seals to the outside circumference of the central nipple. This design results in a very cost effective and quick connect and disconnect mating system. The system has been designed to be one single turn for full connection. The seal that is formed is capable of withstanding very high pressures (300+psi) with very little operator effort for connecting and disconnecting.

The external threads 39 allow the operator to cap the device with an airtight seal for disposal or when not in use. The cartridge can be fabricated out of transparent material 42 and can include a plurality of gradient markings 44, to aid in accurately dispensing a predetermined amount of the lubricant and/or fluorescent dye 32 therefrom. The lubricant canister 26 may further include a piston sealed therein. The piston may be made without any O-rings and uses pressure to further seal on the bore.

Furthermore, the design of the fluidly coupling facility 28 and the mating central nipple 33 ensures that only a minimal amount of fluid is left behind when the connection is disengaged. The fluorescent dye is very concentrated and expensive. In some applications, as little as two ml of fluid is injected per air conditioning or refrigeration system being tested so minimizing fluid loss is critical to the effectiveness of the diagnostic method.

The fluidly coupling facility 28, as shown in FIGS. 1 and 6 through 11, is a connector assembly 47 having a first end connected to the threaded nozzle 38 of the lubricant canister 26 and a second end connected to the service valve 34 of the pressurized system 24. The connector assembly 47 consists of a flexible conduit 48. A threaded fitting 50 is on the first end of the flexible conduit 48, to engage with the threaded nozzle 38 of the lubricant canister 26. A release valve 52 is on the second end of the flexible conduit 48, to engage with the service valve 34 of the pressurized system 24.

The connector assembly 47 further includes a one-way check valve 54 between the threaded fitting 50 and the first end of the flexible conduit 48, which prevents any material from back flushing into and contaminating the lubricant and/or fluorescent dye 32 in the lubricant canister 26. The release valve 52 contains a closeable control knob or valve 56, which prevents any material from back flushing into the flexible conduit 48 from the service valve 34 of the pressurized system 24, and allows the release valve 52 to disconnect from the service valve 34 of the pressurized system 24, to prevent leakage of the lubricant and/or fluorescent dye 32 therefrom.

The release valve 52 in FIGS. 1, 6, 7 and 8, includes a snap lock fitting 58 to engage with the service valve 34 of the pressurized system 24. The release valve 52 in FIGS. 9, 10 and 11, includes a threaded fitting 60, to engage with the service valve 34 of the pressurized system 24.

The lubricant forcing assemblage 30, as shown in FIGS. 1 to 3 and 12 to 20, is an injection device 62. The injection device 62 contains a housing 64 having a receptacle portion 66, to receive the lubricant canister 26 therein. A drive mechanism 68 forces the O-ring piston 40 into the tubular casing 36, to cause the lubricant and/or fluorescent dye 32 to exit the threaded nozzle 38 through the fluidly coupling facility 28, past the service valve 34 and into the pressurized system 24.

Figure 2:
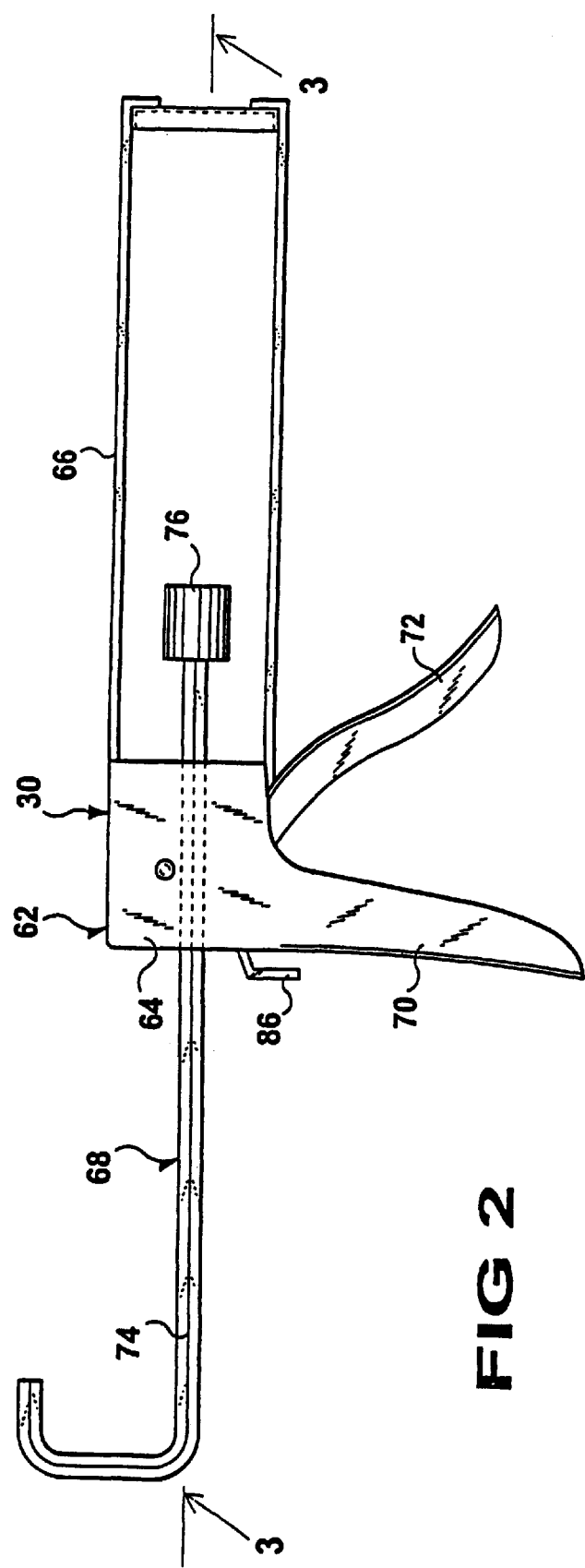
FIG. 2 is an enlarged side view of the injection device shown in FIG. 1.
Figure 3:
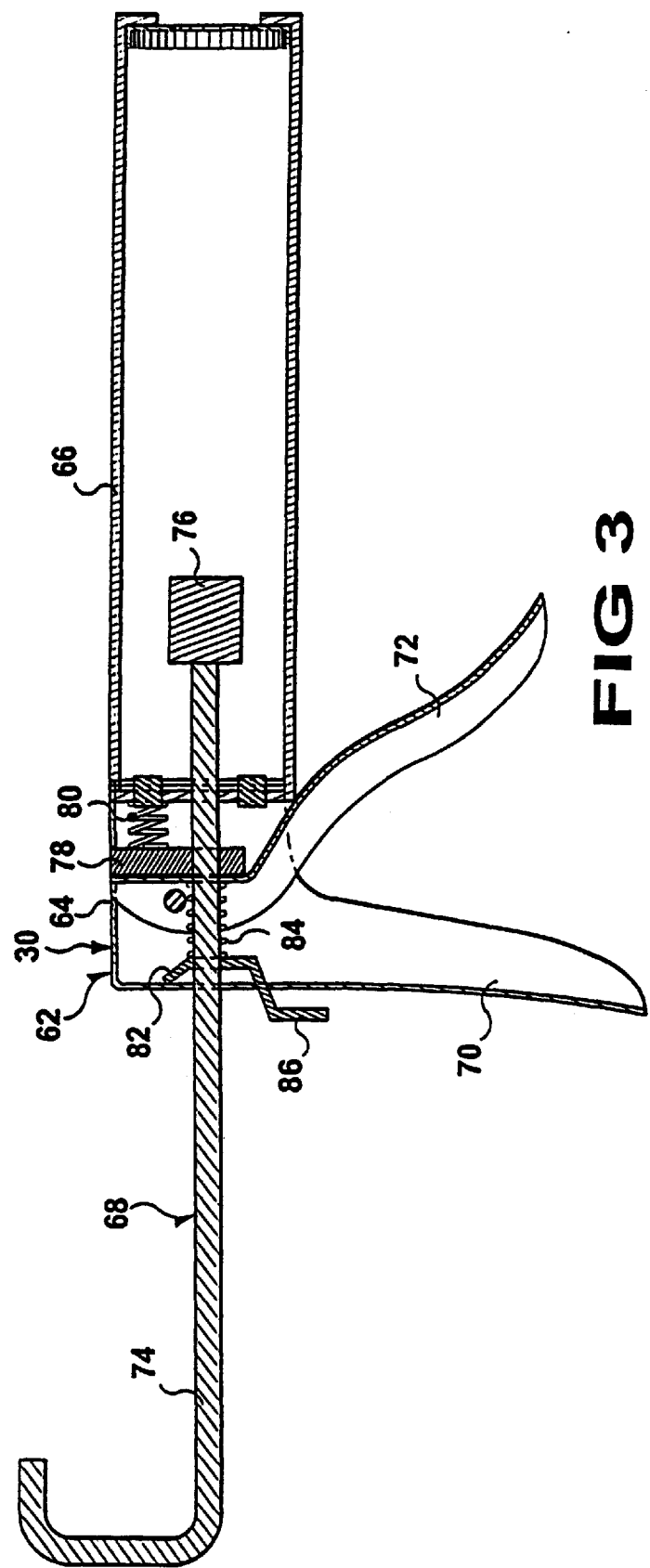
FIG. 3 is a cross sectional view taken along line 3—3 in FIG. 2.

The drive mechanism 68 in FIGS. 1 to 3 includes a hand grip 70 integral with and extending downwardly on the housing 64. A trigger 72 is pivotally mounted to the housing 64 adjacent the handgrip 70. A central drive shaft 74 extends longitudinally through the housing 64 and transversely past a pivotal portion of the trigger 72. A cylindrical head 76 is on an inner end of the central drive shaft 74, to engage with the O-ring piston 40 of the lubricant canister 26.

A first pawl 78 is spring biased at 80 on the central drive shaft 74 forward the pivotal portion of the trigger 72. A second pawl 82 is spring biased at 84 on the central drive shaft 74 rearward the pivotal portion of the trigger 72. The second pawl 82 has a tongue 86 extending out through a rear wall of the housing 64 above the handgrip 70. When the trigger 72 is squeezed the first pawl 78 will move into contact with the central drive shaft 74, to push the central drive shaft 74 forward with the cylindrical head 76 making contact with the recessed O-ring piston 40. The second pawl 82 prevents reverse movement of the central drive shaft 74, until the tongue 86 is lifted up to disengage the second pawl 82, allowing the central drive shaft 74 to be pulled back to a desired position.

The drive mechanism 68 in FIGS. 12 to 15 includes a hand grip 70 integral with and extending downwardly on the housing 64. A trigger 72 is pivotally mounted to the housing 64 adjacent the handgrip 70. A central drive shaft 74 extends longitudinally through the housing 64 and transversely above a pivotal portion of the trigger 72. The central drive shaft 74 has a plurality of teeth 88 extending therealong. A cylindrical head 76 is on an inner end of the central drive shaft 74, to engage with the O-ring piston 40 of the lubricant canister 26.

A pawl 90 is pivotally mounted between the pivotal portion of the trigger 72 and the housing 64. When the trigger 72 is squeezed, the pawl 90 will move into contact with the teeth 88 on the central drive shaft 74, to push the central drive shaft 74 forward with the cylindrical head 76 making contact with the O-ring piston 40. As best seen in FIGS. 13 and 14, the drive mechanism 68 can include a second pawl 92 spring biased in the housing 64 to make contact with the teeth 88 on the central drive shaft 74 forward the first pawl 90, to prevent reverse movement of the central drive shaft 74.

The drive mechanism 68 in FIGS. 16 to 19 includes a stationary nut 94 mounted vertically within a rear wall of the housing 64. An elongated threaded rod 96 extends longitudinally through the stationary nut 94. A cylindrical head 76 on an inner end of the elongated threaded rod 96 engages with the O-ring piston 40 of the lubricant canister 26. A structure 98 on an outer end of the elongated threaded rod 96 is for rotating the elongated threaded rod 96 through the stationary nut 94 and moves the elongated threaded rod 96 with the cylindrical head 76 forward, to make contact with the O-ring piston 40.

The rotating structure 98 in FIGS. 16 and 17 is a bolt head 100, which can be turned by an open end or box wrench 102. The rotating structure 98 in FIG. 18 is a socket head 104, which can be turned by a ratchet socket wrench 106. The rotating structure 98 in FIG. 19 is a handle rod 108 extending transversely through the outer end of the elongated threaded rod 96, which can be turned by a hand of a person.

The drive mechanism 68, shown in FIG. 20, includes a rear chamber 110 formed within the housing 64 and has an inlet port 112 to allow compressed gas to enter the rear chamber 110. A central drive shaft 74 is carried longitudinally within the tubular casing 36 of the lubricant canister 26. A cylindrical head 76 is on an inner end of the central drive shaft 74 to engage with the O-ring piston 40. A transverse drive plate 114 is on an outer end of the central drive shaft 74 within the tubular casing 36 adjacent the rear chamber 110. When the compressed gas is introduced through the inlet port 112 into the rear chamber 110, the transverse drive plate 114 will push the central drive shaft 74 forward with the cylindrical head 76, to make contact with the O-ring piston 40.

Thus, the present invention provides for a device and method for injecting a small amount of a concentrated fluorescent additive or dye into the system, thereby making any leaks easier to find. The fluorescent dye can be injected into the system with the present device or they can be placed in the systems at the original equipment manufacturing facility prior to the system being put into service. These air conditioning and refrigeration systems are closed loop recirculating systems and the secondary fluid is a lubricant that also travels throughout the system while in operation. The dye will travel throughout the system and leak out with the refrigerant. The dye will leave a stain that can be further enhanced with the use of an ultraviolet (UV) lamp. The UV wavelength of light will excite the dye allowing the operator to more easily identify the exact location of the leak. The device can also be used to add the appropriate lubricant to the air conditioning or refrigeration system without stopping the system and without any special equipment.

Finally, a cartridge that is at or about atmospheric pressure while not in use contains the concentrated fluorescent dye and/or lubricant. The cartridge is connected to the device of the present invention in a way that will raise the pressure of the dye above that of the operating system. The connection between the device and the operating system must be airtight. The connection can be a quick coupler, thread or other means of positive, sealed connection.

It will be understood that each of the elements described above, or two or more together may also find a useful application in other types of methods differing from the type describe above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A cartridge for charging a closed, pressurized air conditioning or refrigeration system with a fluid, comprising:

a) a closed, non-pressurized cylindrical cartridge,
wherein the cartridge has two ends, a first open end and a second open end,
wherein the first open end comprises an inner nozzle which connects to the system being charged and an outer nozzle;

b) a predetermined amount of the fluid; and c) a piston sealably disposed with the second open end of the cartridge, wherein the cartridge is adapted to connect sealably and releasably to the pressurized air conditioning or refrigeration system via fluidly coupling means to form a closed binary system, wherein the fluidly coupling means is a connector assembly having a first end connected to the inner nozzle of the cartridge and a second end connected to a service valve of the pressurized system, wherein the connector assembly comprises:

i) a flexible conduit, ii) a thread on a first end of the flexible conduit, to engage with the inner nozzle of the cartridge, and iii) a release valve on a second end of the flexible conduit, to engage with the service valve of the pressurized system, and wherein the connector assembly further comprises a valve at one end of the flexible conduit, which prevents any material from back flushing into and contaminating the fluid in the cartridge.

2. The cartridge of claim 1, wherein the fluid comprises a lubricant for the air conditioning or refrigeration system.

3. The cartridge of claim 1, wherein the fluid comprises a fluid dye for the air conditioning or refrigeration system.

4. The cartridge of claim 1, wherein the fluid comprises a lubricant and a fluid dye for the air conditioning or refrigeration system.

5. The cartridge of claim 1, wherein the fluid is maintained in the cartridge at about ambient pressure.

6. The cartridge of claim 1, wherein the cartridge is fabricated out of transparent material and includes a plurality of gradient markings.

7. The cartridge of claim 1, wherein the inner nozzle is surrounded by an internal thread.

8. The cartridge of claim 1, wherein the outer nozzle is surrounded by an external thread.

9. The cartridge of claim 8, wherein the outer nozzle comprises a threaded cap for engagement with the external thread.

10. The cartridge of claim 1, wherein the inner nozzle is surrounded by an internal thread and wherein the outer nozzle is surrounded by an external thread.

11. The cartridge of claim 1, wherein the piston further comprises an O-ring.

12. The cartridge of claim 1, wherein the piston further comprises a recessed double O-ring.

* * * * *